United States Patent [19]

Ludwig

[11] Patent Number: 5,362,507
[45] Date of Patent: Nov. 8, 1994

[54] METHOD OF PROCESSING FRESHLY SLAUGHTERED FOWL MEAT

[75] Inventor: Wolfgang Ludwig, Highland, N.Y.

[73] Assignee: WTI, Inc., Highland, N.Y.

[21] Appl. No.: 154,951

[22] Filed: Nov. 19, 1993

[51] Int. Cl.⁵ .............................................. A23L 1/315
[52] U.S. Cl. ...................................... 426/281; 426/644
[58] Field of Search ............... 426/641, 644, 281, 519

[56] References Cited

U.S. PATENT DOCUMENTS

| | | | |
|---|---|---|---|
| 2,596,067 | 5/1952 | Brissey | 426/281 X |
| 3,119,696 | 1/1964 | Williams | 426/281 X |
| 3,122,440 | 2/1964 | Williams | 426/281 X |
| 3,399,063 | 8/1968 | Schwall et al. | 426/281 |
| 3,413,127 | 11/1968 | Schwall et al. | 426/644 X |
| 3,782,975 | 1/1974 | Zyss | 426/281 |
| 3,928,634 | 12/1975 | Gasbarro | 426/644 X |
| 4,663,173 | 5/1987 | Clatfelter et al. | 426/641 X |
| 5,069,922 | 12/1991 | Brotsky et al. | 426/644 X |

OTHER PUBLICATIONS

Scientific American, H. E. Huxley, "The Contraction of Muscle", pp. 3 through 14, (1958).

*Primary Examiner*—Arthur L. Corbin
*Attorney, Agent, or Firm*—Herbert Dubno; Jonathan Myers

[57] ABSTRACT

The chemical effects of rigor mortis requiring aging of fowl meat following fresh-slaughter and before packing and freezing are eliminated by treating the meat with a diphosphate solution and massaging to incorporate up to preferably 0.5% by weight of the diphosphate in the meat. Elimination of the aging step prevents interruption of the processing line and the presence of the diphosphate eliminates toughness associated with nonaged meat.

16 Claims, No Drawings

METHOD OF PROCESSING FRESHLY SLAUGHTERED FOWL MEAT

FIELD OF THE INVENTION

The present invention relates to a method of treating meat and, more particularly, to a method of treating fresh-slaughtered fowl and other edible animal products which may manifest an increasing toughness following slaughter, either as a precondition to further treatment (e.g. a brine or salt treatment or cure) or to freezing and packaging.

BACKGROUND OF THE INVENTION

It is known that chickens and turkeys cannot be slaughtered, defeathered, killed and packed for freezing directly upon the processing line without a period of aging, usually for about eight hours, intervening between the freezing of the fowl and the earlier stages of treatment. Other animal products also require such aging and the need for the aging step has proved to be a handicap in efforts to process meat in a single processing line in a continuous manner to the frozen stage. Furthermore, the toughness associated with rigor mortis may only be attenuated by an aging stage.

The need for the aging step which, in the case of chickens, turkeys and the like, requires the fowl or the parts thereof to be processed, to be placed in bags or other containers and stored for periods of up to eight hours, is that rigor mortis sets in some 2½ to 3 hours after slaughter, giving rise to a progressive toughening of the meat. The meat, if prematurely frozen, will remain tough when defrosted and the chemical processes of rigor can interfere with the cooking process and, of course, with the taste and texture of the meat.

To avoid the effect of rigor mortis on the toughening of the muscle, an aging or holdover step has been required heretofore to allow the chemical processes associated with rigor mortis to fully subside and permit the muscle to return to a tender state, before packing or further processing.

In the following discussion, reference will be made to the processing of chicken by way of simplifying the description. However, the principles of this invention are applicable wherever aging has been required following the fresh slaughter of the animal to avoid the toughness associated with the chemical processes of rigor mortis in the muscle tissue of the piece of meat. The invention is applicable, therefore, not only to chickens, but also to other fowl including turkey, to parts thereof such as turkey breasts, and to other meat which, like ham, may require substantial aging before further processing, freezing or packaging in its final form for distribution to the consumer. The invention may be used, moreover, to avoid the aging of fresh-killed meat wherever the aging is inconvenient for the on line processing thereof.

OBJECTS OF THE INVENTION

It is, therefore, the principal object of the present invention to provide an improved method of processing meat whereby the drawbacks of earlier methods and especially the need for an aging step, are obviated.

Another object of the invention is to provide an improved method of processing meat which enables on-line processing of the meat without interruption for an aging step, e.g. in the case in which the meat is to be further processed, packed and/or frozen.

Still another object of the invention is to provide a continuous method of processing meat without the need for an aging step.

SUMMARY OF THE INVENTION

I have discovered, quite surprisingly in view of the long-recognized need for aging fresh-killed meat to avoid the toughness associated with the chemical processes of rigor mortise, that by incorporating in the fresh-killed meat a diphosphate, it is possible to overcome those chemical processes or eliminate the effect thereof without aging, thereby permitting the meat to be processed on-line and without the aging step hitherto thought to be necessary.

The treatment can be part of initial cooling of the fresh slaughtered meat by including up to 2% of diphosphate in the cooling water in which the meat is immersed; it can be a separate step in the processing line when the solution is massaged into the meat with or without salt when no aging is used; it can be applied after the onset of rigor mortis to tenderize the meat. It can even be used after aging, when required, to eliminate toughness remaining after aging. After the treatment, the meat can be further processed with brine, salt or another curing process or frozen and packed.

DETAILED DESCRIPTION OF THE INVENTION

More particularly, a method of processing meat, particularly fowl and either the whole fowl or parts of chicken, turkey or other edible fowl, comprises the steps of:

(a) obtaining a piece of fresh-slaughtered meat prior, during or right after onset of substantial rigor mortis;

(b) mechanically working into the piece of meat prior, during or right after substantial onset of rigor mortis an aqueous solution of a diphosphate at a concentration and for a period sufficient to bring about a diphosphate level in the piece of meat of substantially 0.05 to substantially 0.5% by weight thereof, thereby eliminating a need for extensive preprocessing aging of the meat; and (c) thereafter optionally further processing the piece of meat or freezing the piece of meat.

According to the invention the solution can be injected into the piece of meat and/or brought into contact with the piece of meat by other means, e.g. spraying the solution onto the piece of meat, the piece of meat being then subjected to mechanical massage to incorporate the solution into the piece of meat. Preferably up to 0.5% of the diphosphate is so incorporated, the meat is cooled during the massaging process, and preferably, prior thereto, and the massage is effected in an evacuated massaging tumbling or pitting vessel utilizing particularly the W.T.I. cold massage equipment.

The massaging process can be effected for a period of time between 15 minutes and 4 hours depending on size of the meat piece, although a period between 15 minutes and 2 hours is preferred.

The temperature of the meat during the massaging process should be brought below 40° F.

The solution can contain the diphosphate at a concentration between 0.05 and 0.5, preferably about 0.2.

The diphosphate may be any diphosphate compatible with the requirements of the food industry and preferably is a tetrasodium diphosphate or tetrapotassium diphosphate. Advantageously, I use a tetrapotassium diphosphate buffered to a pH of 7.3 to 11 with phosphoric acid and available in a concentration of 50% diphosphate which is added directly to or mixed with water and salt to form a brine which is then injected and/or massaged into the meat.

SPECIFIC EXAMPLE 1000 pounds of fresh-killed whole chickens is processed in a continuous line through the slaughter, defeathering, and immersion in a chilling bath to reduce the temperature from 98.6° F. to 55° F.–40° F. 1000 pounds of the chicken thus processed, without interruption of the line and aging, is then sprayed with 1 to 5 of a 50% solution of tetrapotassium diphosphate buffered with phosphoric acid to a pH of 7.3 and massaged for a period of 2 hours until the muscle of the chicken contains 0.05% to 0.5% by weight of the diphosphate. The product could then be further processed, or frozen without an aging period and had excellent taste and cooking qualities with all of the tenderness associated with an 8 hour aging process of a control quantity of the chicken which was not treated with the diphosphate solution. The treatment with diphosphate solution was carried out in a W.T.I. Inc. vacuum massager operated at a temperature of 28° F., and the meat was cooled to a temperature of 40° F. during treatment.

I claim:

1. A method of processing freshly-slaughtered fowl meat to avoid toughness of the meat without employing an aging step, comprising the steps of:
   (a) obtaining a piece of freshly-slaughtered fowl meat prior to, during or immediately after onset of substantial rigor mortis;
   (b) mechanically working into said piece of fowl meat, prior to, during or immediately after onset of substantial rigor mortis, an aqueous solution consisting essentially of water and a diphosphate at a concentration and for a time period sufficient to bring about a diphosphate level in said piece of fowl meat of substantially 0.05 to substantially 0.5% by weight thereof, thereby eliminating a need for extensive preprocessing or prefreezing aging of the fowl meat; and
   (c) thereafter further processing said piece of fowl meat and/or freezing and wrapping the piece of fowl meat.

2. The method defined in claim 1 wherein said solution is sprayed onto said piece of meat and said piece of meat is subjected to mechanical massage to incorporate said solution in said piece of meat.

3. The method defined in claim 2 wherein said piece of fowl meat is cooled during said mechanical massage.

4. The method defined in claim 2 wherein a brine solution containing said diphosphate, salt and spices is used to treat the fowl meat, and further comprising cooling said solution prior to contacting the fowl meat therewith.

5. The method defined in claim 2 wherein said piece of fowl meat is cooled after slaughter to a temperature of 40° F. to 57° F. by immersing said piece of fowl meat in said solution and cooling said solution, either during or before the mechanical massaging of the fowl meat during step (b).

6. The method defined in claim 2 wherein said mechanical massage is effected for a period of 15 minutes to two hours.

7. The method defined in claim 2 wherein said mechanical massage is effected at a temperature of about 40° F.

8. The method defined in claim 2 wherein said solution contains said diphosphate at a concentration between 0.05% and about 0.5%.

9. The method defined in claim 2 wherein said solution is a solution of tetrasodium diphosphate or tetrapotassium diphosphate.

10. The method defined in claim 9 wherein said solution is prepared by diluting a concentrate of about 50% by weight tetrapotassium diphosphate, buffered to a lower pH with phosphoric acid, with water to which salt is added.

11. The method defined in claim 2 wherein said piece of fowl meat is obtained from an upstream portion of a meat packing line in which a fowl is slaughtered, eviscerated and cooled, said piece of fowl meat being massaged in the presence of said solution along the same line.

12. The method defined in claim 11 wherein said piece of fowl meat is a fresh-killed chicken or a part thereof.

13. The method defined in claim 11 wherein said piece of fowl meat is a turkey breast.

14. The method defined in claim 2 wherein the diphosphate level in said fowl meat is controlled so as not to exceed 0.5% by weight thereof.

15. The method defined in claim 14 wherein said solution is mechanically worked into said fowl meat up to 8 hours after slaughter.

16. The method defined in claim 1 wherein said mechanical massage is effected in an evacuated vessel.

* * * * *